Aug. 15, 1967  J. L. MYERS  3,336,560
MULTI-OUTLET WIRING DEVICE
Filed Sept. 3, 1965
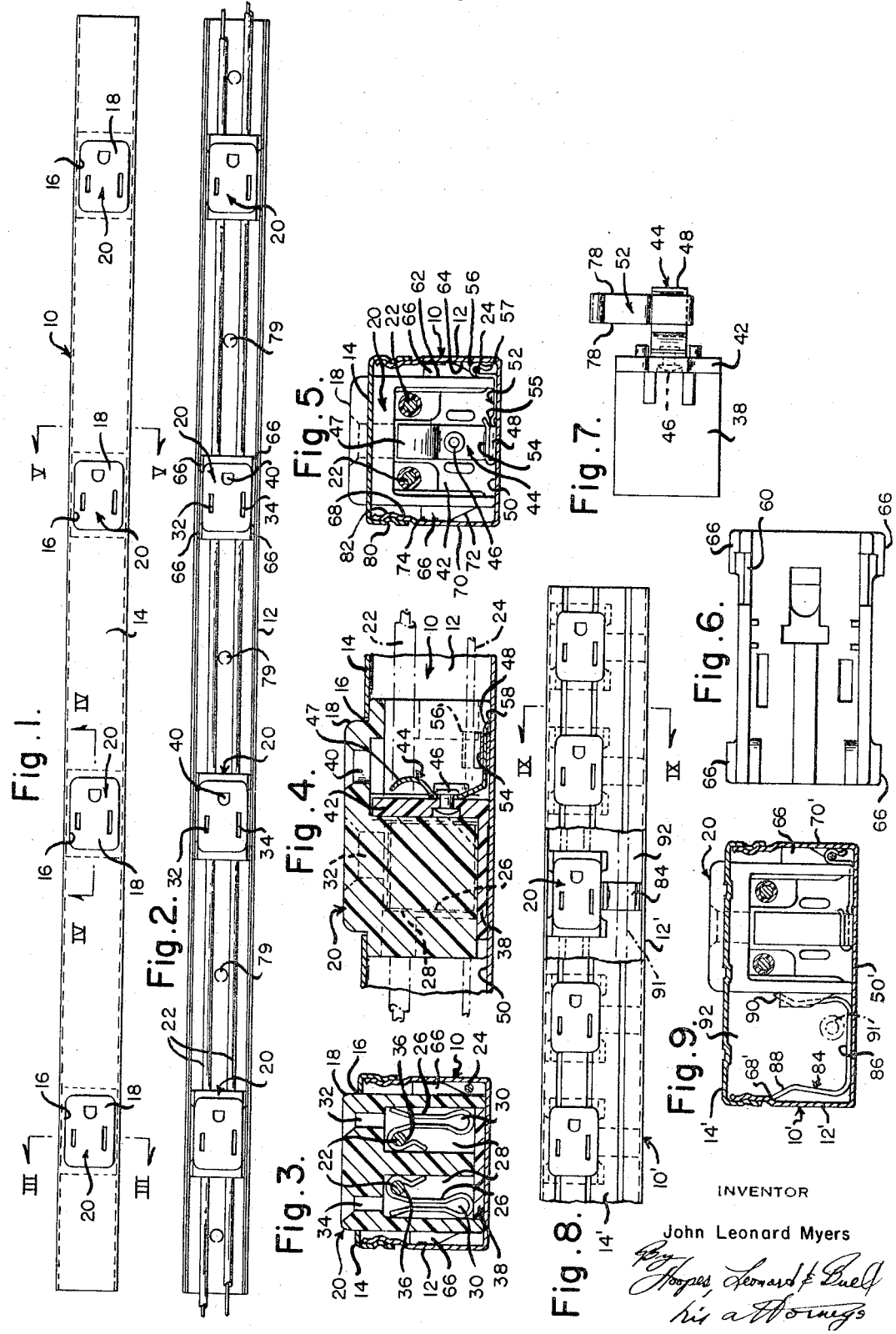
INVENTOR
John Leonard Myers United States Patent Office 3,336,560
Patented Aug. 15, 1967

3,336,560
MULTI-OUTLET WIRING DEVICE
John Leonard Myers, Leetsdale, Pa., assignor to H. K. Porter Company, Inc., Pittsburgh, Pa., a corporation of Delaware
Filed Sept. 3, 1965, Ser. No. 484,909
10 Claims. (Cl. 339—14)

My present invention relates to wiring devices and more particularly to a multi-outlet electrical raceway and receptacle combination.

In modern office buildings and other public buildings, metallic multi-outlet electrical raceways are frequently utilized in place of the older and more conventional wall mounted receptacle boxes. Such raceways, which additionally serve as electrical conduits for the outlets can be installed at a convenient height above the floor as, for example, along the top of wainscoating if used, or near the floor as at the top of the baseboard. When thus installed, the multi-outlet raceway is, of course, exposed to contact by personnel within the building and, when properly grounded by means of a suitable electrical conduit or conductor electrically engaging the raceway and extending to the external system ground at the electrical entrance of the building, presents no electrical or shock hazard to such personnel. However, there always exists a possibility, through improper or negligent installation or through vibration or other mishandling, that the aforementioned grounding conduit or conductor can become loosened or detached altogether, either at its raceway end or at the building electrical entrance, or at raceway to raceway connections, with the result that either a high-resistance path or an open circuit to ground will occur. If this occurs, then a failure in any of the outlets, in the appliances connected thereto, or in the electrical circuit or circuits within the raceway will result in the application of dangerous above or below ground potentials to the exposed raceway. Accordingly, it is desirable to supply an auxiliary path to the external system ground from the raceway, in addition to the aforementioned conduit or ground conductor.

A more serious problem arises in connection with the assembly of a number of wiring devices, such as outlet receptacles, in the raceway. In many areas grounding-type receptacles are required both to afford maximum protection to personnel using the raceway outlets and the electrical appliances connected thereto, and to the appliances also. For ease of manufacture and assembly, the grounding receptacles are frequently provided with grounding contacts which frictionally engage the inner surfaces of the metallic raceway to establish a path to ground through the raceway. However, through improper assembly or use, the grounding contacts can be disengaged or fail initially to engage the raceway. Moreover, the raceways usually are painted inside and out prior to assembly with the result that care must be taken to ensure that the frictional engagement of the grounding contacts gouges the coating of paint sufficiently to establish low-resistance contact with the raceway. Therefore, it is desirable to provide a grounding contact arrangement for each receptacle or the like which will electrically engage the raceway at a plurality of contact points to ensure a low-resistance grounding path between the receptacles and the raceway. Moreover, it is desirable in many applications to provide an alternate or auxiliary grounding path from each grounding receptacle or other wiring device directly to the aforementioned external system ground.

Still another problem arises in the use of such multi-outlet raceways in older buildings or in remodeling projects. In such cases the raceway is installed without a separate conduit or grounding conductor coupling the raceway directly to the external system ground. Instead reliance is made upon a connection of the grounding wire of ordinary grounding electrical cable at one end of the raceway. However, a single electrical contact such as this may fail altogether or develop high resistance for the reasons noted above and elsewhere herein. Accordingly it is desirable to extend the aforesaid grounding wire completely through the raceway in order to make electrical contact therebetween at multiple contact points. It is also desirable in many cases to connect the extended grounding wire also to each of the receptacles so that both the receptacles and the raceway are provided with dual grounding paths.

I have solved these problems and have accomplished the aforesaid stated ends by providing multiple means for grounding both the raceway and each of the wiring devices housed therein in order to ensure the existence of at least one path to ground from each wiring device, in the event of failure of another grounding path as by excessive vibration, inexpert or improper installation, accumulation of dirt, oxide, or other foreign matter or the like. Such grounding means are effected by the provisions of an elongated metallic raceway structure, a grounding type receptacle means or other wiring device requiring a grounded connection positioned within said raceway and having grounding contact means engaging said raceway and including additional contact means for engaging an auxiliary ground conductor, conductors for connecting said wiring devices to a source of potential, and an additional conductor engaged by said grounding contact means for connecting both said contact means and said raceway structure to an external ground.

I further arrange the aforesaid wiring devices and grounding contact means within the raceway so that final assembly of the raceway components causes said grounding contact means compressingly to engage both the metallic raceway structure and the grounding wire to ensure highly conductive contact therebetween. I arrange the entire raceway and wiring device assembly so that the same can be assembled, together with appropriate electrical conductors therefor, in a quick-attach manner so as to reduce both manufacturing time and expense. In one arrangement of my wiring device the raceway therefore is adapted for the accommodation of additional electric wiring or circuits not necessarily required by some or all of the aforementioned wiring devices contained in the raceway.

These and other objects, features, and advantages of the invention, together with structural details thereof will be elaborated upon as the following description of presently preferred embodiments thereof proceeds.

In the accompanying drawings, I have shown certain presently preferred embodiments of the invention wherein:

FIGURE 1 is a top plan view of one form of multi-outlet wiring device arranged in accordance with my invention;

FIGURE 2 is a top plan view of the wiring device of FIGURE 1 with the cover thereof removed;

FIGURE 3 is a cross-sectional view of the wiring device of FIGURE 1 taken along reference plane III—III thereof;

FIGURE 4 is a partial longitudinally sectional view of the wiring device of FIGURE 1 and taken along reference plane IV—IV thereof;

FIGURE 5 is another cross-sectional view of the wiring device of FIGURE 1 taken along reference plane V—V thereof;

FIGURE 6 is a bottom plan view of one of the receptacles adapted for mounting in the wiring device structure, with the conductors, contacts, and bottom cover thereof removed;

FIGURE 7 is a top plan view of the bottom cover and grounding contact means removed from FIGURE 6;

FIGURE 8 is a top plan view, with portions thereof broken away, of another form of multi-outlet device of my invention; and, FIGURE 9 is a cross-sectional view of the wiring device shown in FIGURE 8 and taken along reference plane IX—IX thereof.

Referring now more particularly to FIGURES 1 and 2 of the drawings, the exemplary form of the invention shown therein includes an electrical raceway 10 having an elongated trough portion 12 and cover 14 therefor. The cover 14 is provided with suitable apertures 16 at intervals along its length for the accommodations of the raised contact receiving or crown portions 18 of wiring devices 20, which portions project respectively through the apertures 16. Each of the receptacles 20 are electrically connected in the manner described below, to a pair of power leads 22 and to a grounding conductor 24, which are inserted in parallel fashion through the raceway 10.

Referring now to FIGURES 3 to 5 of the drawings, one arrangement for electrically connecting the receptacles 20 to the power leads 22 is shown therein. In this arrangement, a pair of resilient re-entrant electrical contact members 26 are contained respectively in cavities 28 of each receptcale 20. The re-entrant portion 30 of each contact 26 is aligned with an associated blade receiving slot 32 or 34 of the receptacle. The slots 34 can be made longer than the slots 32 in the event it is desired to utilize polarizing plugs (not shown).

Each re-entrant contact 26 is snapped around a bared portion 36 of the associated power lead and is tightened thereabout by compressing the free ends of the re-entrant contact together when the latter are inserted into the contact receiving recesses 28. When thus inserted, the contacts 26 are secured in their proper positions by frictional engagement of their free ends with the adjacent wall surfaces of the recesses 28 and by a bottom cover 38, described hereinafter more fully. The recesses 28 extend longitudinally through each receptacle 20, and the power leads 22, with each having a bared or stripped portion 36 at each receptacle, thus extend completely through the raceway 10 without interruption. Therefore, each of the receptacles 20 can be quickly assembled to the power leads 22 by means of the quick-attach, re-entrant contacts 26, thereby eliminating the need for fastening means such as screws and for severing the power leads 22 at each receptacle 20.

The raised or crown portion 18 of the receptacle 20 is further provided with a grounding slot 40, and the bottom cover 38 includes an integrally molded up-right or partition member 42. A grounding contact or strap 44 is secured to the up-right portion 42, by means of a rivet 46 or other suitable fastener and is positioned for engagement of its first contact portion 47 with a grounding blade (not shown) when inserted through the opening 40. A second contact portion 48 of the grounding contact 44 frictionally engages the inner surface of an adjacent portion of the bottom raceway wall 50, as viewed in FIGURES 4 and 5 of the drawings, to afford grounding contact between the grounding contact 44 and the raceway 10. In furtherance of this purpose, the lower end 58 (as viewed in FIGURE 4) is bent downwardly to afford a scraping action when the receptacle is assembled into the raceway 10 for the removal of any paint or surface corrosion in order to establish good electric contact directly between the contact 44 and raceway wall 50.

As seen in FIGURES 3 to 5, and 7, the grounding contact 44, in this arrangement, is provided with a ground jumper or auxiliary grounding contact 52. The ground jumper 52 is generally of L-shaped configuration and is provided with a folded over portion 54 or 56 at each end thereof. The folded portion 54 is adapted to frictionally engage the grounding strap 44 to provide electrical contact between the grounding strap and the auxiliary grounding contact 52. The ground jumper 52 is formed with transverse ribs 55 and 57 (FIGURE 5) positioned respectively adjacent the folded ends 54 and 56 to lend a snap-in feature to the connections between the folded ends and the grounding contact 44 and ground conductor 24, respectively. The bent-down portion 58 is sufficiently offset to allow the adjacent parts of the ground jumper 52 to pass under the grounding strap without terminating direct contact between the bent-down portion 58 and the raceway 10.

At the corner of the L-shaped ground jumper 52, the latter passes around the adjacent edge of the receptacle 20, preferably in a corner notch 60 therefor, as better shown in FIGURE 6. This arrangement allows proper seating of the receptacle 20 within the raceway 10. At the outer end of the ground jumper 52 the folded over portion 56 thereof is so shaped as to snap about an adjacent bare portion of the ground conductor 24. The outwardly facing surfaces of the folded ground jumper portion 56 project outwardly from the adjacent side wall 62 of the receptacle 20 sufficiently that they are forcefully engaged by the adjacent inner side wall portion 64 of the raceway structure 10 so as to ensure good electrical contact between the folded over portion 56 and the trough member 12 of the raceway 10. This forceful engagement also compresses the folded over portion 56 about the ground conductor 24 for the purpose also of ensuring good electrical contact between the conductor 24 and the ground jumper 52. The ground conductor 24, incidentally, can be bared throughout its length or can be provided with an insulated covering and stripped in the areas of engagement with the ground jumpers 52, as desired.

In assembling the multi-outlet wiring device of the invention, each of the receptacles 20 together with their re-entrant power contacts 26 and their grounding contacts 44 and 52 are secured in accordance with the foregoing description at spaced locations along a parallel array of the power conductors 22 and the ground conductor 24. The resulting receptacle harness is then carefully placed within the elongated trough portion 12 of the raceway 10 and each receptacle 20 is then snapped into position within the trough 12. In one arrangement for thus securing each receptacle 20 in the trough 12, I contemplate the provision of a pair of projections 66 on each side wall 62 of the receptacle 20, as better shown in FIGURES 3, 5, and 6. These projections 66 span a width which is slightly greater than that defined by the lower indents 68 opposingly formed on the vertical side walls 70 of the trough 12, as viewed in FIGURE 5 of the drawings. Before the cover 14 is snapped into place on the trough 12, the side walls 70 can, of course, be sprung slightly outward to accommodate the passage of the projections 66, which are provided with lower, inwardly inclined portions 72 for this purpose.

The upper corners 74 of the projection 66, as viewed in FIGURE 5, and the lower indents 68 of the trough side walls 70 are so spaced that the receptacles 20 are firmly seated upon the floor 50 of the trough 12. This firm engagement of the receptacles 20 with the floor 50 serves to forcefully engage the grounding strap 44 and the ground jumpers 52 with adjacent portions of the floor 50 and the adjacent side wall 70, respectively, of the trough 12. At the same time, the folded over portion 54 of the ground jumper 52 is pressed into firm engagement with the ground strap 44 to ensure good electrical contact therebetween.

With this arrangement, it will be seen that a large number of contact points are provided between the grounding contact 44 and the ground jumper 52 on one hand and the adjacent inner surfaces of the raceway trough 12, on the other hand.

Therefore, there is virtually no chance that the projecting ends of the grounding strap 44 and of the ground jumper 52 or the lateral edges 78 (FIGURE 7) of the ground jumper will fail to scrape or cut through any paint or other insulative foreign matter on the inner surfaces of the trough 12. Moreover, in the event of any such failure of the grounding strap 44 to thus ground itself to the raceway trough 12, which is, of course, grounded at its end to an external ground in accordance with conventional wiring procedures, the grounding contact 44 is provided with another grounding path, through its associated grounding jumper 52 directly to the externally grounded conductor 24. Since the grounding conductor 24 is thus in electrical contact with the raceway trough 12 at a number of points along the raceway, i.e., at each receptacle 20, the grounding conductor also serves as an additional grounding path for the raceway 10 itself, in the event that the normal, external ground thereof (not shown) should ever become detached or interrupted in some manner, or was omitted entirely in the original installation.

Before inserting the aforementioned receptacle harness within the trough 12, the latter may be mounted upon a suitable building structure through the use of appropriate fastening means such as screws (not shown) inserted through the openings remaining after removal of some or all of knock-outs 79 (FIGURE 2). After the trough 12 has been so mounted and the receptacle harness snapped in place therein, as described above, the raceway cover 14 is then snapped in place on the trough 12, the sides 70 of which can be sprung slightly inwardly to engage the longitudinally extending detents 80 of the cover 14 with similar detents 82 formed respectively on the side walls 70.

Referring now to FIGURES 8 and 9 of the drawings, another form of raceway 10' is provided for use with the receptacle harness described above. The raceway 10' is provided with wider cover and trough portions 14' and 12' but in other respects is generally similar to the raceway 10 of FIGURES 1 and 2. Insofar as mounting the receptacles 20 therein, the additional width is accommodated and the receptacles 20 are retained in the trough 12' by engagement of their side projections 66 against one side wall portion 70' of the trough 12' and by frictional engagement with a U-shaped retaining clip 84, the bight portion 86 of which is seated upon the floor 50', of the trough 12'. One of the leg portions 88 of the clip 84 abuts the adjacent indent 68' of the trough 12' while the other clip leg 90 frictionally engages the adjacent wall structure of the receptacle 20. With this arrangement, a free space 92 extends uninterruptedly and longitudinally through the raceway 10', in which space additional electric circuits, leads or conductor, such as the conductor 91 can be inserted. Thus, the raceway 10' can be employed as an electrical conduit for the passage of additional circuits therethrough independently of the receptacles 20, or alternatively the conductor 91 can be the third power lead of a three-wire 120/240-volt system. In still other arrangements, a pair of conductors such as 91 can serve as the interconnecting leads between a pair of cooperating three-way switches (not shown) positioned respectively adjacent the ends of the raceway 10' for simultaneously energizing and de-energizing the receptacles 20 from either end of the raceway.

From the foregoing it will be apparent that novel and efficient forms of multi-outlet wiring devices have been disclosed herein. While I have shown and described certain presently preferred embodiments of the invention, it is to be distinctly understood that the invention is not limited thereto but may be otherwise variously employed within the scope of the appended claims. Furthermore, it is to be understood that certain features of the invention can be advantageously utilized without a corresponding use of other features thereof.

I claim:

1. In a multi-outlet wiring device the combination comprising an elongated raceway, a plurality of grounding type wiring devices mounted within said raceway, each of said wiring devices having a grounding strap engaging the inner surface of said raceway, a ground jumper for each of said grounding straps, said ground jumper engaging said raceway and said grounding straps respectively in electrically conductive relationship, and circuit means for supplying electric potential from an external source to said wiring devices.

2. In a multi-outlet wiring device the combination comprising an elongated raceway, a plurality of grounding type wiring devices mounted within said raceway, each of said wiring devices having a grounding strap engaging the inner surface of said raceway, a ground jumper for each of said grounding straps, said ground jumper engaging said raceway and said grounding straps respectively in electrically conductive relationship, circuit means for supplying electric potential from external source to said wiring devices, and a ground conductor extending along the length of said raceway, said ground jumper being engaged with said ground conductor in electrically conductive relationship.

3. In a grounding type outlet fixture, the combination comprising a raceway, a grounding type receptacle closely fitted within said raceway, said receptacle having a first grounding contact extending into electrical engagement with said raceway and having a second grounding contact extending along an inner surface portion of said raceway, said first and second grounding contacts being pressed into engagement with one another and with the adjacent inner surfaces of said raceway when said receptacle is retained therein.

4. In a multi-outlet wiring device, the combination comprising an elongated raceway, a plurality of grounding type wiring devices spacedly mounted in said raceway and closely fitted wherein, each of said wiring devices having a first grounding contact extending into engagement with an adjacent inner surface portion of said raceway and having a second grounding contact overlying an adjacent inner surface portion of said raceway, said first and said second grounding contacts being pressed into electrical engagement with one another and with said adjacent inner surface portions respectively when said wiring devices are inserted into and retained in said raceway, and circuit means for supplying electric potentials to each of said wiring devices from an external source and for connecting said grounding contacts to an external ground.

5. In an electrical raceway and wiring device structure, the combination comprising an elongated raceway, a plurality of wiring devices spacedly mounted along the length of said raceway, each of said wiring devices being retained in said raceway adjacent one side thereof by a spring clip mounted in said raceway adjacent one side of the associated wiring devices to space said wiring devices from the other side of said raceway, each of said wiring devices and its associated spring clip being retained in said raceway by a pair of indents extending along the length of said raceway and cooperating respectively with projections formed on said wiring devices and said spring clips respectively, means for grounding each of said wiring devices to said raceway, and circuit means for supplying electric potentials to each of said wiring devices and for connecting each of said grounding means to an external ground.

6. In a multi-outlet wiring device, the combination comprising an elongated raceway, a plurality of electrical outlet means mounted at spaced locations along the length of said raceway, each of said outlet means being closely fitted within said raceway and retained therein by a projection on each side of said outlet means and by elongated indents extending along the length of said raceway and cooperating respectively with said projections, each of said outlet means having a grounding contact extending into bearing engagement with said raceway for electrical contact therewith, and circuit means for supplying potential to each of said outlet means from an external source and for connecting each of said grounding contacts to an external ground.

7. The combination according to claim 6 wherein said circuit means includes a pair of power leads extending along the length of said raceway and electrically connected to each of said outlet means through quick-attach terminals, and includes a separate grounding conductor extending longitudinally through said raceway and connected to each of said grounding contacts through a quick attach terminal forming part thereof.

8. In a raceway and wiring device structure, the combination comprising at least one wiring device of generally rectangular cross-sectional configuration, a raceway portion shaped to closely receive said wiring device, said wiring device including a first grounding strap extending into electrical engagement with the adjacent inner surface of said raceway portion and including a second grounding strap of generally "L-shaped" configuration, said second grounding strap extending around a notched corner portion of said wiring device, said second strap extending into bearing engagement with the adjacent inner surfaces of side and floor portions of said raceway and with said first grounding strap when said wiring device is closely fitted within said raceway so as to ensure multiple points of electrical contact between said first and said second grounding straps and said raceway inner surfaces, and circuit means for supplying electrical potentials to said wiring devices from an external source.

9. The combination according to claim 8 characterized in that a separate ground conductor is connected to said second grounding strap in electrically conductive relation therewith for grounding said strap directly to an external ground.

10. The combination according to claim 4 characterized in that said second grounding contact includes a folded over portion adjacent each end thereof and a transverse rib forming part of each folded over portion, one of said folded end portions engaging said first grounding contact and the other of said folded portions engaging a conductor forming part of said circuit means, said transverse ribs respectively imparting a snap-in feature to said folded over portions.

References Cited

UNITED STATES PATENTS

| | | | |
|---|---|---|---|
| 2,216,765 | 10/1940 | Clayton | 339—22 X |
| 2,445,604 | 7/1948 | Clayton | 339—150 |
| 2,743,423 | 4/1956 | Parks | 339—21 |
| 3,059,204 | 10/1962 | Johnson | 339—14 |
| 3,118,714 | 1/1964 | Ludwig | 339—14 |

MARVIN A. CHAMPION, *Primary Examiner.*

PATRICK A. CLIFFORD, *Examiner.*